United States Patent [19]
Davis

[11] Patent Number: 6,079,318
[45] Date of Patent: *Jun. 27, 2000

[54] DISPOSABLE BEVERAGE MAKER

[76] Inventor: George T. Davis, P.O. Box 8542, Mission Hills, Calif. 91346

[ * ] Notice: This patent is subject to a terminal disclaimer.

[21] Appl. No.: 09/303,749

[22] Filed: May 3, 1999

[51] Int. Cl.[7] .................................................. A27J 31/00
[52] U.S. Cl. ................................ 99/323; 99/279; 99/304
[58] Field of Search .............................. 229/906; 426/77, 426/82, 78, 425, 431, 432, 433, 435; 99/323, 279, 304

[56] References Cited

U.S. PATENT DOCUMENTS

| | | | |
|---|---|---|---|
| 1,602,254 | 10/1926 | Schindler | 229/906 |
| 2,307,998 | 1/1943 | Eaton | 426/435 |
| 3,971,305 | 7/1976 | Daswick | 99/295 |
| 4,215,628 | 8/1980 | Dodd, Jr. | 99/323 |
| 5,771,777 | 6/1998 | Davis | 89/323 |

*Primary Examiner*—Curtis Sherrer
*Assistant Examiner*—Hao Mai
*Attorney, Agent, or Firm*—Albert O. Cota

[57] ABSTRACT

A disposable beverage maker (10) made from a single sheet of flat, insoluble cardboard or plastic in various sizes. The beverage maker (10) consists of a base (12) having four scored marks (14, 16, 18, 20). Extending outward from two of the scored marks are located a first side wall (22) and a second side wall (36); on the adjoining sides are located a right stabilizing flap (50) and a left stabilizing flap (56). When each of the two side walls (22, 36) are joined at their respective right and left outer sections (32, 34, 46, 48) the beverage maker (10) is fully assembled and may be placed upon the container (70). A filter (72) is then inserted into the beverage maker (10) and a quantity of brewing mix (74), such as coffee grounds, is placed into the filter (72). When hot water (76) is poured onto the brewing mix (74) inside the filter (72), the hot water (76) interacts with the brewing mix (74) and produced a liquid which flows through an elongated slot (68) located on the base (12) and into the container (70).

5 Claims, 3 Drawing Sheets

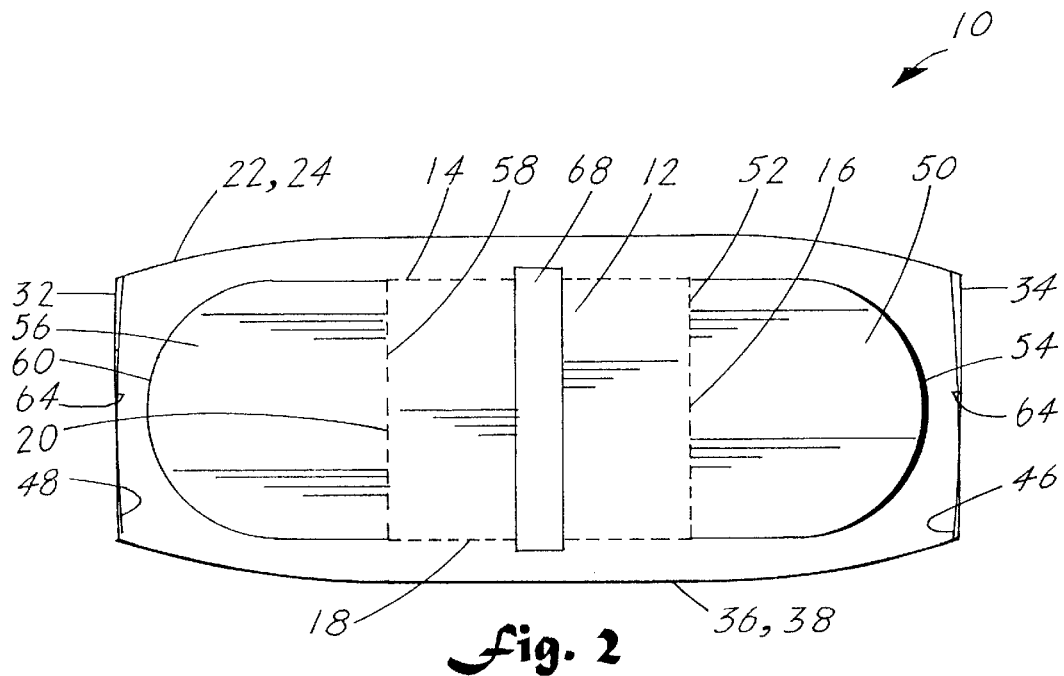
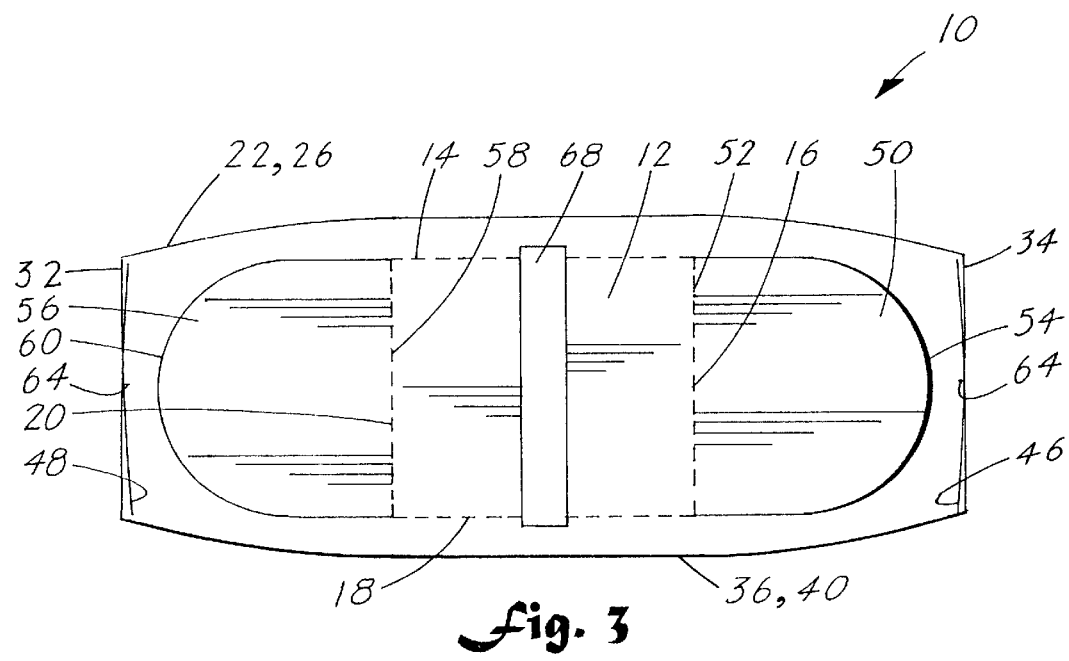

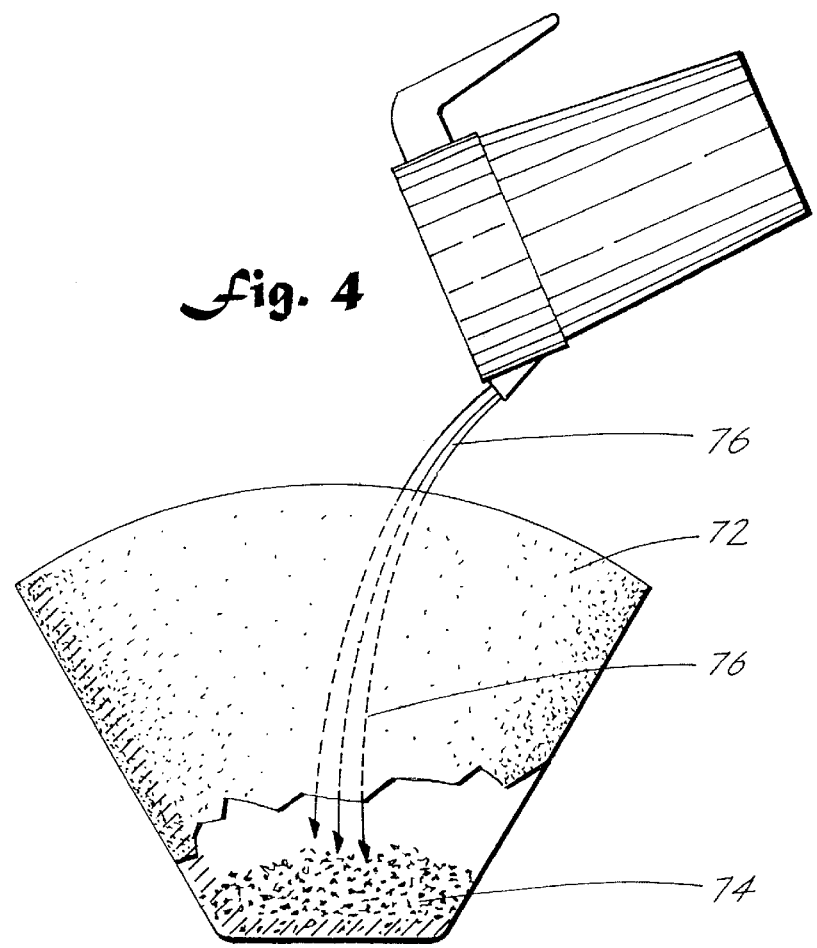
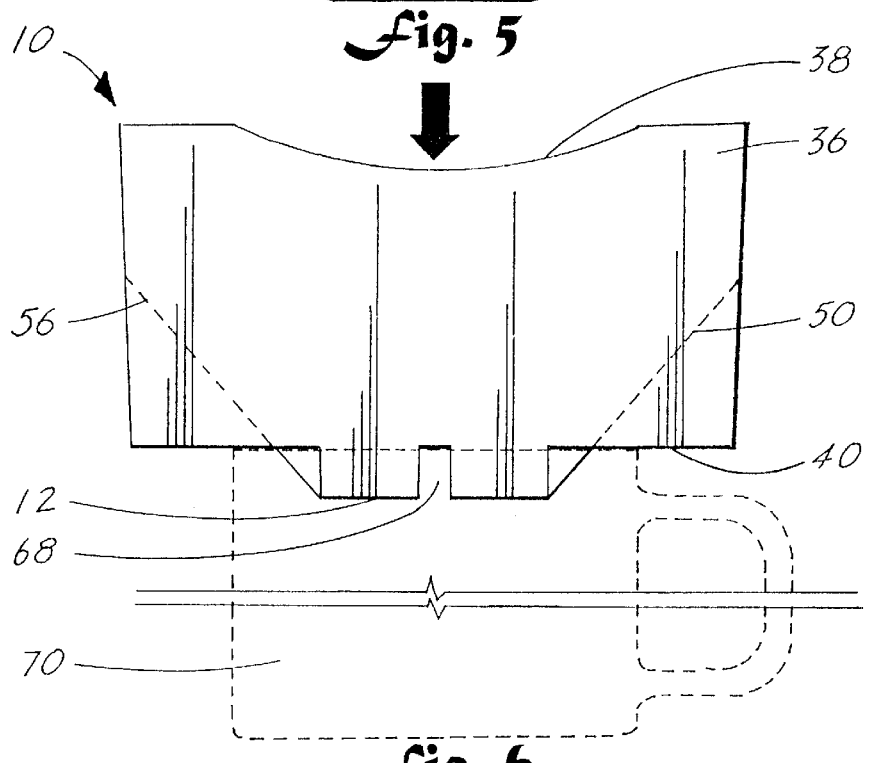

DISPOSABLE BEVERAGE MAKER

TECHNICAL FIELD

The invention pertains to the general field of beverage makers, such as coffee makers, and more particularly to a disposable beverage maker which allows a single cup of a beverage to be made.

BACKGROUND ART

Normally, whenever a beverage requiring the mixture of water and a brewing mix, such as coffee, is desired, there are only two ways by which this can be accomplished. First, an entire pot can be brewed, which will yield between five and eight cups. This manner is usually efficient, especially when there is more than one individual who will be sharing the beverage from the pot, or when one single person desires more than one cup. Unfortunately, a large majority of people only consume one cup at a time and are forced to dispose of the remainder that has been brewed. Even if someone chooses to have a second or third cup, there will still be between three and five cups left over, which will usually go to waste.

The second method commonly used to obtain a cup of beverage is to mix hot water with "instant" admixtures. Instant admixtures allow for as little or as much of the beverage to be made per an individual's desire. Although this method is extremely convenient, many drinkers agree that the taste of the instant beverages are not as favorable to that of the brewed variety; this is especially true with coffee. Therefore, a disposable beverage maker is needed which allows only a single cup, mug or other similar container to be used to brew a beverage, such as coffee or tea. The invention described herein provides such a beverage maker.

A search of the prior art did not disclose any patents that read directly on the claims of the instant invention however, the following U.S. patents were considered related:

| U.S. PAT. NO. | INVENTOR | ISSUED |
|---|---|---|
| 5,771,777 | Davis | June 30, 1998 |
| 4,560,475 | Kataoka | December 24, 1985 |
| 4,602,558 | Kapper, et al | December 3, 1984 |
| 4,602,557 | Yip | July 13, 1984 |

The Deavis U.S. Pat. No. 5,771,777 discloses a disposable beverage maker made from a single sheet of flat, insoluble cardboard or plastic. The cardboard or plastic Consists of a lower base having four scored sides on two of the sides is respectively located a first side wall and a second side wall; on the adjoining sides is respectively located a first stabilizing flap and a second stabilizing flap. From the first side wall extends a first handle and from the second side wall extends a second handle. When each of the two handles are joined at their outward sections, the disposable beverage maker is fully assembled and is inserted into the container consisting of a cup, mug or a decanter. Thereafter, a coffee filter is placed into the beverage maker and a quantity of coffee grounds or tea is placed into the coffee filter. When hot water is poured into the filter, the water interacts with the coffee grounds to allow the resulting coffee liquid to flow through an elongated slot located on the lower base and into the container.

The Kataoka U.S. Pat. No. 4,500,475 discloses a filter assembly which can stand upright on a cup. The assembly has filter paper adhered to the back of a foldable support plate. The support plate includes an intermediate portion with an opening for pouring hot water therethrough, which is covered by the filter, and a pair of support legs connected with the opposite sides of the intermediate portion to have the latter therebetween. Each support legs is formed with at least one slot which extends symmetrically with respect to the longitudinal centerline of the support plate to define a plurality of locking members. The locking members are firmly engagable with a receptacle to support the filter assembly upright when the support legs are folded relative to the intermediate portion along preselected fold lines.

The Kapper U.S. Pat. No. 4,602,,558, et al patent discloses an apparatus for making at least one cup of coffee. The apparatus consists of a container for holding unground coffee, a metering station for metering a portion of unground coffee from the container, a compacting station and an extracting station and for transferring the metered portion to the compacting station from the metering station and form the compacting station to the extracting station. The apparatus also includes a means for compacting the portion at the compaction station including a punch for applying a pressure on the coffee of approximately 1,000 $kg/cm^2$ to break open the closed cells in the coffee. Means are also provided for transferring the compacted coffee at the extraction station to a hot water source for extraction to make a cup of coffee.

The Yip U.S. Pat. No. 4,602,557, discloses a liquid brewing cup having a closed bottom, a closed upraised sidewall that is secured to the bottom to define a central brewing liquid-receiving space, the upper end of the sidewall defining an open top rim. The rim includes a brew bag string-receiving and retaining notch to prevent inadvertent passage of the length of the string and the bag string tab connected thereto into the brewing liquid space during pouring, brewing, stirring and drinking of the liquid in the cup.

For background purposes and as indicative of the art to Which the invention is related reference may be made to the remaining cited patents.

| U.S. PAT. NO. | INVENTOR | ISSUED |
|---|---|---|
| 5,415,475 | Sandy | November 25, 1992 |
| 4,997,015 | Johnson | February 12, 1990 |
| 4,688,479 | Cunningham | August 25, 1987 |
| 4,642,190 | Zimmerman | February 1, 1985 |
| 4,303,525 | Stover | September 14, 1979 |

DISCLOSURE OF THE INVENTION

The disposable beverage maker is designed to allow an individual to conveniently and inexpensively make a single cup of a beverage such as coffee or tea. Although the beverage maker is primarily designed and dimensioned to make a single cup, it can also be produced in various other sizes to accommodate a mug, various sizes of plastic cups or a decanter, in which multiple cups may be made.

In its most basic design configuration, the disposable beverage maker utilizes a flat, insoluble material having:
   a) a base having a first scored mark, a second scored mark, a third scored mark and a fourth scored mark,
   b) a first side wall extending outward from the first scored mark having right and left outer sections,
   c) a second side wall extending outward from the third scored mark having right and left outer sections, d) means for attaching the outer sections of the first and second side walls, e) a right stabilizing flap that abuts the second scored mark and a left stabilizing flap that abuts the fourth scored mark, and f) an elongated slot located laterally along the base.

When the outer sections of the first and second side walls are attached and the first and second stabilizing flaps are folded upward within the side walls, the beverage maker is configured to be placed into a container. When placed into the container, the outer sections of the first and second side walls extend over the lip perimeter of the container. sequentially thereafter, a filter is placed into the beverage maker, a quantity of brewing mix is placed into the beverage filter, and hot water is poured onto the brewing mix. The hot water interacts with the brewing mix, which then causes the resulting liquid to flow through the elongated slot and into the container. Accumulated hot water is then directed back into the container when the beverage maker is lifted from the container for disposal or re-use.

The flat, insoluble material may be comprised of a 12-point to a 24-point cardboard, or plastic material, all of which are approved by the Federal Drug Administration (FDA). If a plastic material is used, the beverage maker can then be washed and reused.

The means for attaching the outer sections of the first and second side walls preferably consists of a slit located on each outer section of the first side wall, and a corresponding tab located on each outer section of the second side wall. When the tabs of the second side wall are inserted into the slits on the first side wall, the beverage maker is securely attached and configured for use.

In view of the above disclosure, it is the primary object of the invention to produce a disposable beverage maker that allows an individual to make a single cup of brewed coffee or similar beverages.

In addition to the primary object of the invention, it is also an object to produce a disposable beverage maker that:

allows a beverage such as coffee or tea to be brewed in a cup, allows a beverage to be made to an individual's taste, allows a beverage to be made in seconds, allows fresh-brewed coffee to be made in small quantity, is convenient to use, eliminates waste which reduces cost, is hygienic, can be used indoors and outdoors; and is cost effective from both a manufacturers and consumers points of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 2 is a top plan view of an assembled disposable beverage maker.

FIG. 3 is a bottom plan view of an assembled disposable beverage maker.

FIG. 4 is an elevational side view of a pitcher that contains hot water that is being poured into a filter.

FIG. 5 is a partial elevational and cutaway view of a typical cone-shaped filter having a brewing mix therein and shown prior to being inserted into the disposable beverage maker.

FIG. 6 is an elevational view of a disposable beverane maker inserted into a mug shown by broken lines.

BEST MODE FOR CARRYING OUT THE INVENTION

Figure 1:
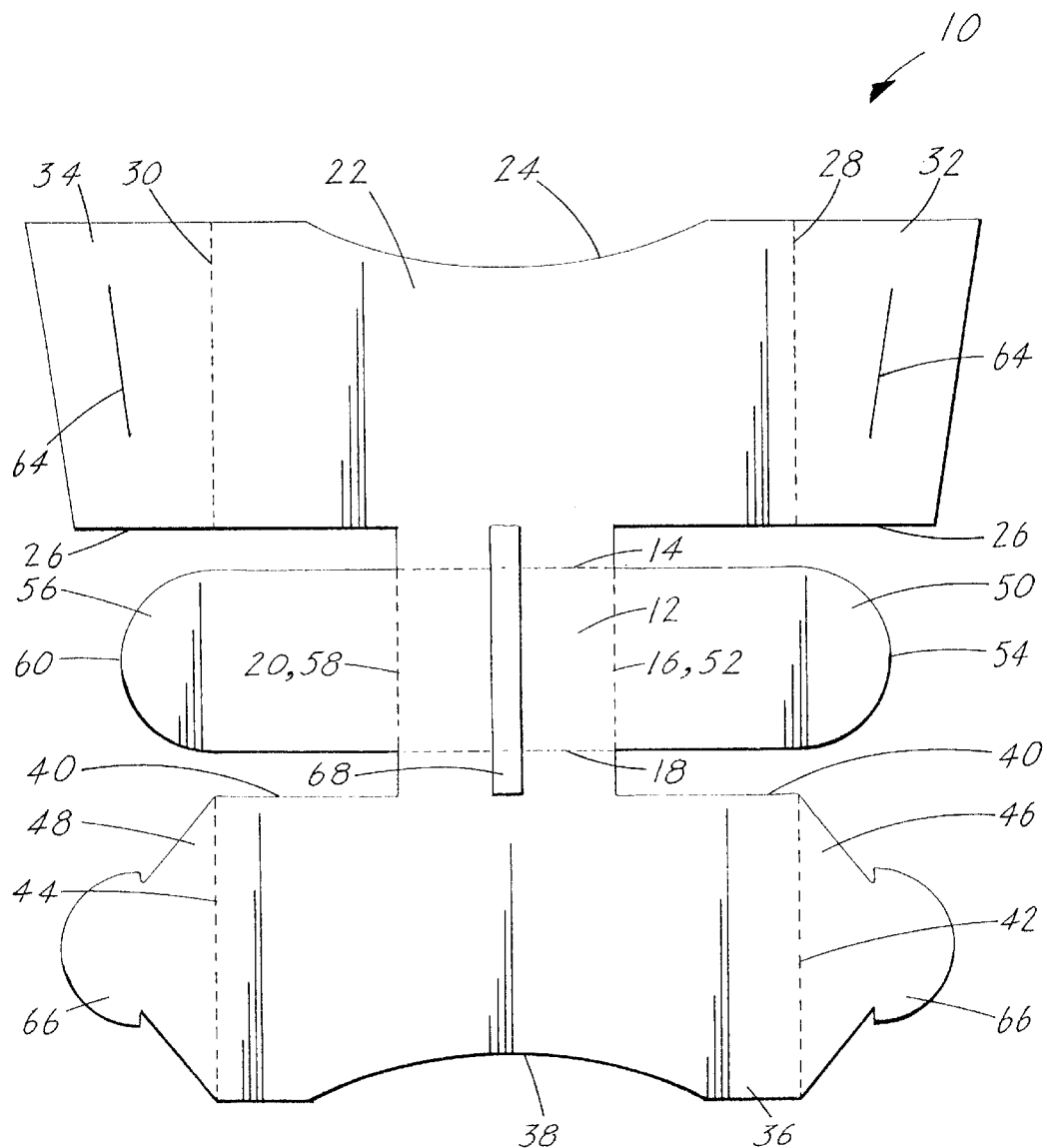
FIG. 1 is a top plan view of an unassembled disposable beverage maker.

The best mode for carrying out the invention is presented in terms of a preferred embodiment for a disposable beverage maker, which may be produced in various sizes. The preferred embodiment of the disposable beverage maker allows coffee, tea or other such brewed beverages to be made, one cup at a time, within the actual serving container.

As shown in FIGS. 1–6, the disposable beverage maker 10, which can be constructed of a water insoluble material such as cardboard or plastic, with cardboard being preferred, is comprised of the following major elements: a base 12, a first side wall 22, a second aide wall 36, a right stabilizing flap 50, and a left stabilizing flap 55. Further, there are four additional elements that even though they are not a part of the invention per se, are required for implementing the invention due to this reason, these elements have been included far descriptive and illustrative purposes and are as follows: a container 70, a beverage filter 72 which can consist of: brewing mix 74 and hot water 76.

As shown in FIGS. 1, 2 and 3 the base 42 has a first scored mark 14, a second scored mark 16, a third scored mark 18 and a fourth scored mark 20. Extending outward from the first scored mark 14 is the first side wall 22, as shown in FIGS. 1 and 6. The first side wall 22 is comprised of an upper edge 4, a lower edge 26, a right scored mark 28, a left scored mark 30, a right outer section 32 and a left outer section 34. The second side wall 36, as also shown in FIGS. 1 and 6, extends outward from the third scored mark 18 and is comprised of an upper edge 39, a lower edge 40, a right scored mark 42, a left scored mark 44, a right outer section 46 and a left outer section 48. As shown in FIG. 1, the upper edges 24, 38 on both side walls 22, 36 are substantially arcuate.

Abutting the second scored mark 16 is the right stabilizing flap 50, and abutting the fourth scored mark 20 is the left stabilizing flap 56. The right stabilizing flap 50 has an inner end 52 and a rounded or straight outer end 54; the left stabilizing flap 56 also has an inner end 5B and a rounded outer end 60. Both stabilizing flaps 58, 56 are shown in FIGS. 1, 2 and 3. Located on each respective right and left outer section 72,34 of the first side wall 22 is a slit 64, as shown in FIG. 1. A corresponding tab 66 is located on each respective right and left outer section 46,40 of the second side wall 36, as also shown in FIG. 1.

An elongated slot 68 is longitudinally and centrally located parallel to the second and fourth scored marks 16, 20 along the base 12 and along a portion of the first and second side walls 22,36 as shown in FIGS. 1, 2 and 3.

As shown in FIG. 1, by maintaining the beverage maker 10 in a flat, non-assembled posture during shipping, displaying, and storing before use, a substantial amount of space can be saved, while also providing a great deal of support for the un-used beverage makers 10. This ensures that every beverage maker will be in perfect condition when removed and prepared for use.

In order to use the beverage maker 10, as shown in FIGS. 4, 5 and 6, it must be interconnected. The first action that is performed to interconnect the beverage maker 10 is to fold the right and left stabilizing flaps 50,56 upward; then, the first side wall 22 is placed in an upward direction at the first scored mark 14. When folded correctly, the first side wall 22 should be at an approximate 90° angle with the base 12. Next, the second side wall 36, which is located on the opposite side of the first side wall 22, is folded upward at the third scored mark 18 in substantially the same manner as described for the first side wall. The two side walls 22,36 are now in upright positions, located substantially parallel to each other and separated along the first and third scored marks 14,18 between the base 12. Once the two side walls 22,36 are in the upright position, the right and left outer sections 32,34 adjacent to the first side wall 22 are folded inward. The right outer section 32 is folded along the right scored mark 28, and the left outer section 34 is folded along the left scored mark 30. This action is then repeated for the right and left outer sections 46,48 on the second side wall 36. When all four outer sections 32, 34, 46, 48 are folded inward, the tabs 66 located on the right and left outer sections 46,48 of the second side wall 36 are inserted into the corresponding slits 64 that are located on the right and left outer sections 32,34 of the first side wall 22.

The disposable beverage maker 10, as shown interconnected in FIG. 6, is now ready to be used. An appropriately sized container 70, such as a clip or a mug is placed on a level, sturdy surface. The beverage maker 10 is then rested on the upper edge of the container 70. When correctly positioned, the beverage maker 10 is supported upon the container's 70 upper edge at two opposing sides by the lower edge 26 of the first side wall 22 and the opposite lower edge 40 of the second side wall 36, as shown in FIG. 6. With the beverage maker 10 in place, it is then possible to place the filter 72 into the beverage maker 10 as shown in FIGS. 5 and 6. The filter 72 an consist of a number 1, 2 or 4 cone shaped filter or a basket-type filter.

With the filter 72 in place, a portion of the brewing mix 74 can be placed into the filter. Hot water 76 in then poured over the brewing mix in the filter 72, as shown in FIGS. 4 and. 5. In a short time, the hot water 76 interacts with the brewing mix 74 and a beverage is produced. The beverage then flows downward, through the elongated slot 68 and into the container 70. Once all of the beverage has entered the container, the beverage maker 10 is removed. As the beverage maker 10 is lifted from the container 700, any accumulated water is directed back into the container. The used beverage maker 10 is then either disposed of, or when constructed of thick cardboard or plastic, washed and stored for re-use.

While the invention has been described in complete detail and pictorially shown in the accompanying drawings it is not to be limited to such details since many changes and modifications may be made in the invention without departing from the spirit and scope thereof. Hence, it is described to cover any and all modifications and forms which may come within the language and scope of the appended claims.

What is claimed is:

1. A disposable beverage maker comprising a flat, insoluble material having:
  a) a base having a first scored mark, a second scored mark, a third scored mark and a fourth scored mark,
  b) a first side wall extending outward from the first scored mark having an upper edge, a lower edge, a right scored mark, a left scored mark, a right outer section and a left outer section,
  c) a second side wall extending outward from the third scored mark having an upper edge, a lower edge, a right scored mark, a left scored mark, a right outer section and a left outer section,
  d) a right stabilizing flap that abuts the second scored mark and a left stabilizing flap that abuts the fourth scored mark,
  e) means for attaching the right outer section of the first side wall to the right outer section of the second side wall; and the left outer section of the first side wall to the left outer section of the second side wall,
  f) an elongated slot located along said base, wherein when the outer sections of said first and second side walls are attached and said right and left stabilizing flaps are folded upward, said beverage maker is configured to be placed with the outer sections of said first and second side walls extending over the lip of a cup or other container, whereupon sequentially a beverage filter is placed into said beverage maker, a quantity of beverage grounds are placed into said beverage filter, and hot water is poured into said filter causing the hot water to interact with the beverage grounds, which then allows the resulting beverage liquid to pass through said elongated slot into the cup or other container.

2. A disposable beverage maker comprising a flat, insoluble material having:
  a) a base bordered by a first scored mark, a second scored mark, a third scored mark and a fourth scored mark,
  b) a first side wall extending outward from the first scored mark and having a right scored mark located normal to the first scored mark, a left scored mark located opposite the right scored mark and normal to the first scored mark, and a right outer section extending outward from the right scored mark, and a left outer section extending outward from the left scored mark,
  c) a second side wall extending outward from the third scored mark and having a right scored mark located normal to the third scored mark, a left scored mark located opposite the right scored mark and normal to the third scored mark, and a right outer section extending outward from the right scored mark, and a left outer section extending outward from the left scored mark, wherein the upper edge of the first and second side walls are arcuate,
  d) a right stabilizing flap having an inner end and an outer rounded edge, wherein the inner end is dimensioned to abut the second scored mark between the first and third scored marks,
  e) a left stabilizing flap having an inner end and an outer rounded edge, wherein the inner end is dimensioned to abut the fourth scored mark between the first and third scored marks,
  f) a slit located on each respective right outer section and left outer section of the first side wall, and a tab located on each respective right outer section and left outer section of the second side wall, and
  g) an elongated slot longitudinally and centrally located parallel to the second and fourth scored marks along said base and along a portion of said first and second side walls, wherein when said first and second walls are folded inward, along the first and third scored marks, and the right and left outer sections of the first and second side walls are folded inward at each respective right and left scored mark, the tab located on the right outer section of the first side wall is inserted into the slit on the right outer section of the second side wall, and the tab located on the left outer section of the first side wall is inserted into the slit on the left outer section of the second side wall, said disposable beverage maker is then configured to be placed into a container, with the outer sections of said first and second side walls extending over the lip of said container, whereupon sequentially, a beverage filter is placed into said beverage maker, a quantity of brewing mix is placed into said beverage filter, and hot water is poured into said filter causing the hot water to interact with the brewing mix which then allows the resulting liquid to pass through the elongated slot into the container.

3. The disposable beverage maker as specified in claim 2 wherein said material comprises a plastic material that can be washed and reused.

4. The disposable beverage maker as specified in claim 2 wherein said beverage maker is dimensioned so that when interconnected said beverage maker rests on the upper edge of a mug.

5. The disposable beverage maker as specified in claim 2 wherein said beverage maker is dimensioned so that when interconnected said beverage maker rests on the upper edge of a decanter.

\* \* \* \* \*